United States Patent [19]

Welles

[11] Patent Number: 4,816,907

[45] Date of Patent: Mar. 28, 1989

[54] TELEVISION SYNCHRONIZING SIGNAL PATTERN CORRECTION CIRCUIT

[75] Inventor: Petrus W. G. Welles, Eindhoven, Netherlands

[73] Assignee: U.S. Philips Corporation, New York, N.Y.

[21] Appl. No.: 37,767

[22] Filed: Apr. 13, 1987

[30] Foreign Application Priority Data

Apr. 25, 1986 [NL] Netherlands ............... 8601062

[51] Int. Cl.$^4$ .............................................. H04N 5/04
[52] U.S. Cl. ...................................... 358/148; 358/155
[58] Field of Search ............... 358/148, 152, 154, 155, 358/158, 319, 320, 337, 153

[56] References Cited

U.S. PATENT DOCUMENTS 4,679,080  7/1987  Bashford et al. ..................... 358/148

FOREIGN PATENT DOCUMENTS 0147138  7/1985  European Pat. Off. ............ 358/155

*Primary Examiner*—James J. Groody
*Assistant Examiner*—Michael D. Parker
*Attorney, Agent, or Firm*—Michael E. Marion

[57] ABSTRACT

A television synchronizing signal pattern correction circuit has a change-over switch (23) which can supply a vertical synchronizing signal (V') obtained from an input (13) or from an output (17) of a delay circuit (15). The change-over switch (23) is operated by a signal obtained from an output (31) of a simple measuring circuit (9). With the aid of two pairs of D-flipflops (35, 37; 39, 41), two exclusive-OR gates (43, 45), two AND-gates (47, 49) and a JK-flipflop (52) the measuring circuit (9) measures the mutual location of undelayed (at 11) and delayed (at 19) vertical synchronizing signals with respect to a signal (at 7) having a duty cycle of fifty percent and representing the horizontal synchronizing signals. As a result, unwanted irregularities in the selected vertical synchronizing signal can be avoided, thus making it usable for, inter alia, the synchronization of writing into a field memory.

4 Claims, 1 Drawing Sheet

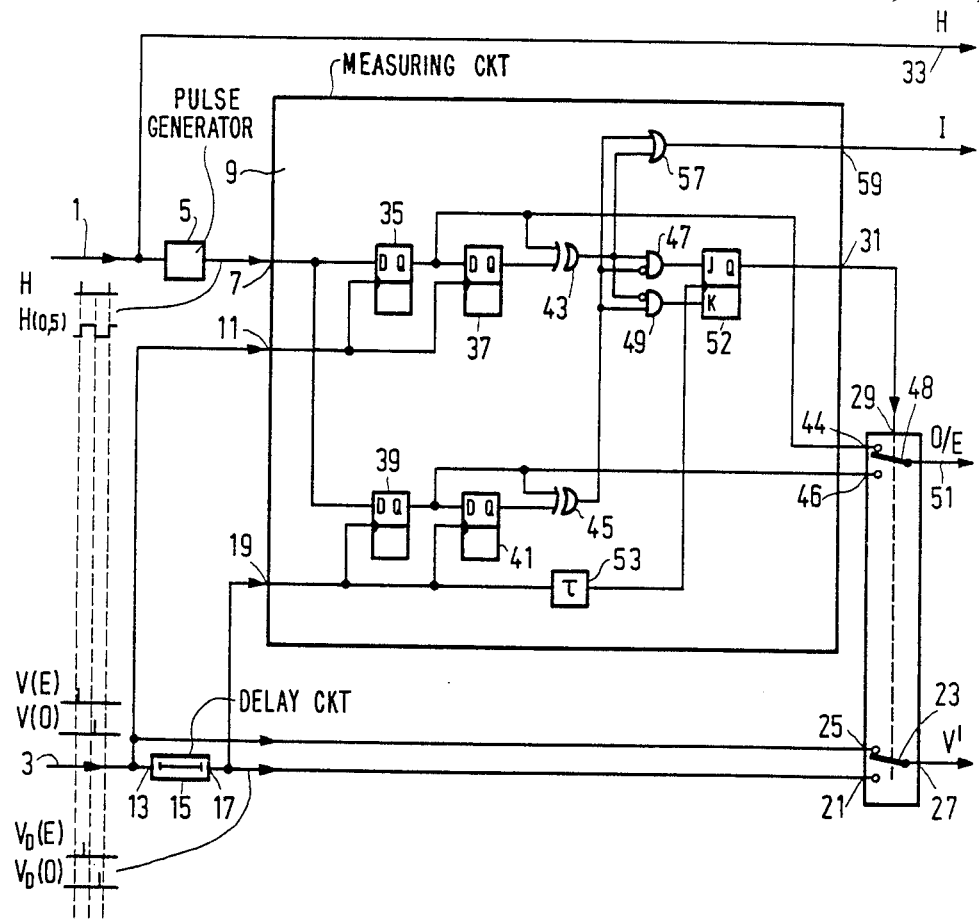

TELEVISION SYNCHRONIZING SIGNAL PATTERN CORRECTION CIRCUIT

BACKGROUND OF THE INVENTION

The invention relates to a television synchronizing signal pattern correction circuit for correcting the mutual location of a horizontal and a vertical synchronizing signal pattern of a television signal in such a manner that incidental substantial coincidence of a horizontal and a vertical synchronizing signal is avoided, said circuit comprising a vertical synchronizing signal path which includes a change-over switch coupled to an input and an output of a delay circuit and being operable by means of a measuring circuit for measuring the mutual location of the horizontal and the vertical synchronizing signal pattern, said measuring circuit having a first input for applying a signal thereto representing the horizontal synchronizing signal pattern and a second input for applying a signal thereto representing the vertical synchronizing signal pattern.

A television synchronizing signal pattern correction circuit of the type described above is known from U.S. Pat. No. 4,684,986. As is indicated in this publication a circuit of this type may be used, for example, to render the synchronization of writing into a memory insensitive to variations in the mutual location of the horizontal and vertical synchronizing signal patterns. Such variations may occur, for example, in television signals obtained from a video recorder.

SUMMARY OF THE INVENTION

It is an object of the invention to provide a simple construction of such a circuit.

According to the invention a television synchronizing signal pattern correction circuit of the type described in the opening paragraph is therefore characterized in that the first input is coupled to an output of a pulse generator for a signal representing the horizontal synchronizing signal pattern with a duty cycle of substantially fifty percent, in that the second input of the measuring circuit is coupled to the input of the delay circuit and in that a third input of the measuring circuit is coupled to the output of the delay circuit, while the measuring circuit comprises two pairs of successively arranged D-flipflops with the clock signal inputs of the one pair being connected to the second input and the clock signal inputs of the other pair being connected to the third input, the D-input of the first D-flipflop of each pair being connected to the first input of the measuring circuit and the D-input and an output of the second D-flipflop of each pair being connected to the inputs of an exclusive-OR gate circuit whose outputs are connected via a gate circuit to the inputs of a JK-flipflop, the clock signal input of which is coupled to the third input and an output of which supplies a switching signal for the change-over switch.

For some uses it is desirable to know whether the synchronizing signal patterns corrected in their mutual location are associated with an even or an odd field in an interlaced television signal. This can be ascertained in a simple manner in a further embodiment of the circuit according to the invention which is characterized in that a change-over switch is coupled to an output of the JK-flipflop for obtaining an even-odd indication signal, the inputs of said change-over switch being connected to the D-inputs of the second D-flipflop of each pair.

A further possible embodiment of the invention is characterized in that a gate circuit for obtaining an output signal indicating whether the horizontal and vertical synchronizing signal patterns are interlaced or non-interlaced is coupled to the D-inputs and the outputs of the second D-flipflop of each pair.

BRIEF DESCRIPTION OF THE DRAWING

The invention will now be described in greater detail with reference to the drawing, comprising only one FIGURE illustrating by way of a combination of a block diagram, and a principle circuit diagram a possible embodiment of a television synchronizing signal pattern correction circuit according to the invention.

DETAILED DESCRIPTION OF THE INVENTION

In the drawing a horizontal and a vertical synchronizing signal H and V of a television signal are applied to an input 1 and an input 3, respectively, of the circuit. The input 1 is connected to an input of a pulse generator 5 which supplies from its output connected to a first input 7 of a measuring circuit 9, a signal H(O,5) having a duty cycle of fifty percent. The input 3 is connected to a second input 11 of the measuring circuit 9 and to an input 13 of a delay circuit 15 having a delay of approximately a quarter of a line period, for example, sixteen microseconds, an output 17 is connected to a third input 19 of the measuring circuit 9 and to an input 21 of a change-over switch 23, a further input 25 of which is connected to the input 13 of the delay circuit 15. An output 27 of the change-over switch 23 supplies a vertical synchronizing signal V' which, as will be explained hereinafter, does not coincide with a horizontal synchronising signal H occurring at an output 33 of the circuit connected to the input 1 as a result of a signal applied to a switching signal input 29 and originating from an output 31 of the measuring circuit 9.

The input 7 of the measuring circuit 9 is connected to the D-input of the first D-flipflop of a first and a second pair of successively arranged D-flipflops 35, 37 and 39, 41, respectively. The clock signal inputs of the first and second pairs of D-flipflops 35, 37 and 39, 41 are connected to the second and third inputs 11 and 19, respectively, of the measuring circuit 9 and thus they receive a vertical synchronizing signal which is undelayed and delayed, respectively. The Q-outputs of the first D-flipflops 35 and 39 of each pair are connected to the D-inputs of the second D-flipflops 37 and 41, respectively, of each pair, to inputs of exclusive-OR gates 43 and 45 and to inputs 44 and 46, respectively, of a second change-over switch 48, which is also operated by the switching signal at the input 29 and whose output 51 supplies a signal O/E indicating whether the signals V' supplied by the change-over switch 23 are associated with an odd or an even field of an interlaced television signal.

The outputs of the exclusive-OR gates 43 and 45 are connected to inputs of AND-gates 47 and 49, respectively, the inverting further inputs of which are connected to the outputs of the exclusive-OR gates 45 and 43, respectively, and the outputs of which are connected to the J and K-inputs, respectively, of a JK-flipflop 52, the Q-output of which is connected to the outputs 31 of the measuring circuit 9 and the clock signal input of which is connected via a delay time correction circuit 53 to the third input 19 of the measuring circuit 9. The delay time correction circuit 53 ensures correction for the delay in the D-flipflop 41 and the gate circuit path 45, 47, 49.

The outputs of the exclusive-OR gates 43, 45 are also connected to the inputs of an OR-gate 57, the output of which applies a signal I to an output 59 of the circuit, which signal indicates whether the synchronizing signals applied to the inputs of the measuring circuit 9 are associated with an interlaced or non-interlaced television signal.

The circuit operates as follows:

When a signal H(O,5) whose positive edge coincide with the horizontal synchronizing signal pulses H is applied to the input 7 of the measuring circuit 9 and when the input 3 of the circuit receives a vertical synchronizing signal from an interlaced television signal whose pulses V(E), for example, associated with the even fields, occur shortly after the positive edges of the signal H(O,5) and whose pulses V(O) associated with the odd fields, occur shortly after the negative edges of the signal H(O,5), then the delayed pulses $V_D(E)$ associated with the even fields will occur shortly before the negative edges and the delayes pulses $V_D(O)$ associated with the odd fields will occur shortly before the positive edges of the signal H(O,5) at the output 17 of the delay circuit 15.

The first D-flipflops 35 and 39 now alternately supply a logic one and a logic zero signal at their Q-outputs after the occurrence of V(E) and V(O), and $V_D(E)$ and $V_D(O)$, respectively, which signals appear at the Q-outputs of the second D-flip-flops 37 and 41 after the occurrence of the subsequent V(O) and V(E), and $V_D(O)$ and $V_D(E)$, respectively, so that the D-inputs of these second D-flipflops are then alternately logic zero and logic one. The exclusive-OR gates 43 and 45 then each time receive a logic zero signal at one of their inputs and a logic one signal at the other of their inputs and their outputs are then each time logic one so that the AND-gates 47 and 49 supply a logic zero signal and the JK-flipflop 52 does not change its state which is assumed to supply a logic one signal from its Q-output. The change-over switches 23 and 48 then remain in the position shown, and the signal V' at the output 27 of the change-over switch 23 is equal to the signal at the input 3 of the circuit, and the signal Q/E at the output 51 of the change-over switch 48 indicates whether the signal at the output 27 of the change-over switch 23 is associated with an even or an odd field.

If, for example, one of the signals V(E) and V(O) almost coincides with a positive and a negative edge of the signal H(O,5) respectively, as may occur in the even of signals originating from, for example, a video recorder the signal V(O) for example is shifted to the left of the negative edge of the signal H(O,5) so that a short time later the exclusive-OR gate 43 receives a logic one signal at its two inputs resulting in the K-input of the JK-flipflop 52 becoming logic one a short time later and the Q-output thereof becoming logic zero with the change-over switches 23 and 48 assuming the position not shown so that the output 27 of the change-over switch 23 will supply the signal $V_D$ originating from the output 17 of the delay circuit 15, which signal is then also shifted to the left and is thus located correctly.

The same happens when the signal V(E) occurs to the left of the signal H(O,5) in which event the exclusive-OR gate 43 receives a logic zero signal at its two inputs so that also the output of the AND-gate 49 becomes logic one.

Similarly, it is evident that the output of the AND-gate 47 becomes logic one when one of the signals $V_D(E)$ or $V_D(O)$ would occur on the other side of the relevant edge of the H(O,5) signal. The JK-flipflop 52 then assumes the state in which its Q-output becomes logic one and the change-over switches 23 and 48 will assume the position shown because the signals V(E) and V(O) are then correctly located.

If the television signal from which the signals at the inputs 1 and 3 of the circuit originate is non-interlaced, each of the two exclusive-OR-gates 43 and 45 will generally receive a logic one or a logic zero signal continuously so that the state of the JK-flipflop 52 cannot change and the change-over switches 23 and 48 do not change their position. The OR-gate 57 will then supply a logic one signal, thus indicating that there is a non-interlaced television signal.

Similarly, it is evident that the JK-flipflop 52 will set the change-over switch 23 in such a position that there will be no passage in the output signal V' if one of the signals V or $V_D$ comes in the neighborhood of an edge of the H(O,5) signal and if there is, for example, a passage relative to this edge from field to field.

I claim:

1. A television synchronizing signal pattern correction circuit for correcting the mutual location of a horizontal and a vertical synchronizing signal pattern of a television signal in such a manner that incidental substantial coincidence of a horizontal and a vertical synchronizing signal is avoided, said circuit comprising a vertical synchronizing signal path which includes a change-over switch coupled to an input and an output of a delay circuit and being operable by means of a measuring circuit for measuring the mutual location of the horizontal and the vertical synchronizing signal pattern, said measuring circuit having a first input for applying a signal thereto representing the horizontal synchronizing signal pattern and a second input for applying a signal thereto representing the vertical synchronizing signal pattern, characterized in that the first input is coupled to an output of a pulse generator for a signal representing the horizontal synchronizing signal pattern with a duty cycle of substantially fifty percent, in that the second input of the measuring circuit is coupled to the input of the delay circuit and in that a third input of the measuring circuit is coupled to the output (17) of the delay circuit (15), while the measuring circuit (9) includes two pairs of successively arranged D-flipflops with the clock signal inputs of the one pair being connected to the second input and the clock signal inputs of the other pair being coupled to the third input the D-input of the first D-flipflop of each pair being coupled to the first input of the measuring circuit and the D-input and an output of the second D-flipflop of each pair being coupled to the inputs of a respective exclusive-OR gate whose outputs are connected via a gate circuit to the inputs of a JK-flipflop the clock signal input of which is coupled to the third input and an output of which supplies a switching signal for the change-over switch.

2. A television synchronizing signal pattern correction circuit as claimed in claim 1, wherein in that a second change-over switch is coupled to the output of the JK-flipflop for obtaining an even-odd indication signal, the inputs of said switch being connected to the D-inputs of the second D-flipflop of each pair.

3. A television synchronizing signal pattern correction circuit as claimed in claim 1, wherein a second gate circuit for obtaining an output signal indicating whether the horizontal and vertical synchronizing signal patterns are interlaced or non-interlaced is coupled to the D-inputs, and the outputs of the second D-flipflop of each pair via the respective exclusive-OR gates.

4. A television synchronizing signal pattern correction circuit as claimed in claim 2, wherein a second gate circuit for obtaining an output signal indicating whether the horizontal or vertical synchronizing signal patterns are interlaced or non-interlaced is coupled to the D-inputs, and the outputs of the second D-flipflop of each pair via the respective exclusive-OR gates.

* * * * *